United States Patent [19]
Peelman et al.

[11] 3,988,581
[45] Oct. 26, 1976

[54] RADIOACTIVE WELL LOGGING SYSTEM WITH SHALE (BORON) COMPENSATION BY GAMMA RAY BUILD-UP

[75] Inventors: Harold E. Peelman; Dan M. Arnold; Robert W. Pitts, Jr., all of Houston, Tex.

[73] Assignee: Texaco Inc., New York, N.Y.

[22] Filed: Apr. 14, 1975

[21] Appl. No.: 567,786

[52] U.S. Cl. ............................................. 250/270
[51] Int. Cl.² ........................................ G01V 5/00
[58] Field of Search ............ 250/261, 262, 269, 270

[56] References Cited
UNITED STATES PATENTS 3,772,513   11/1973   Hall, Jr. et al. ..................... 250/262

*Primary Examiner*—Davis L. Willis
*Attorney, Agent, or Firm*—T. H. Whaley; C. G. Ries; William J. Beard

[57] ABSTRACT

Earth formations in the vicinity of a well borehole are repetitively bombarded with bursts of high energy neutrons. A radiation detector in a sonde in the borehole senses the gamma rays induced by the capture of thermal neutrons and sends signals representative thereof to the surface. At the surface, two single channel energy analyzers, such as from 1.30 to 2.92 Mev and from 3.43 to 10.0 Mev, sense the formation thermal neutron capture gamma ray response after each neutron burst. The counts of thermal neutron capture gamma rays in these analyzers are used to distinguish between the presence of salt water and hydrocarbons, which is logged. By controlling the repetition rate of the neutron source, measured counting rates in formations with relatively large thermal neutron lifetimes are emphasized, compensating for borehole effects which could otherwise give rise to erroneous results in shale formations, which have a high boron content.

11 Claims, 5 Drawing Figures

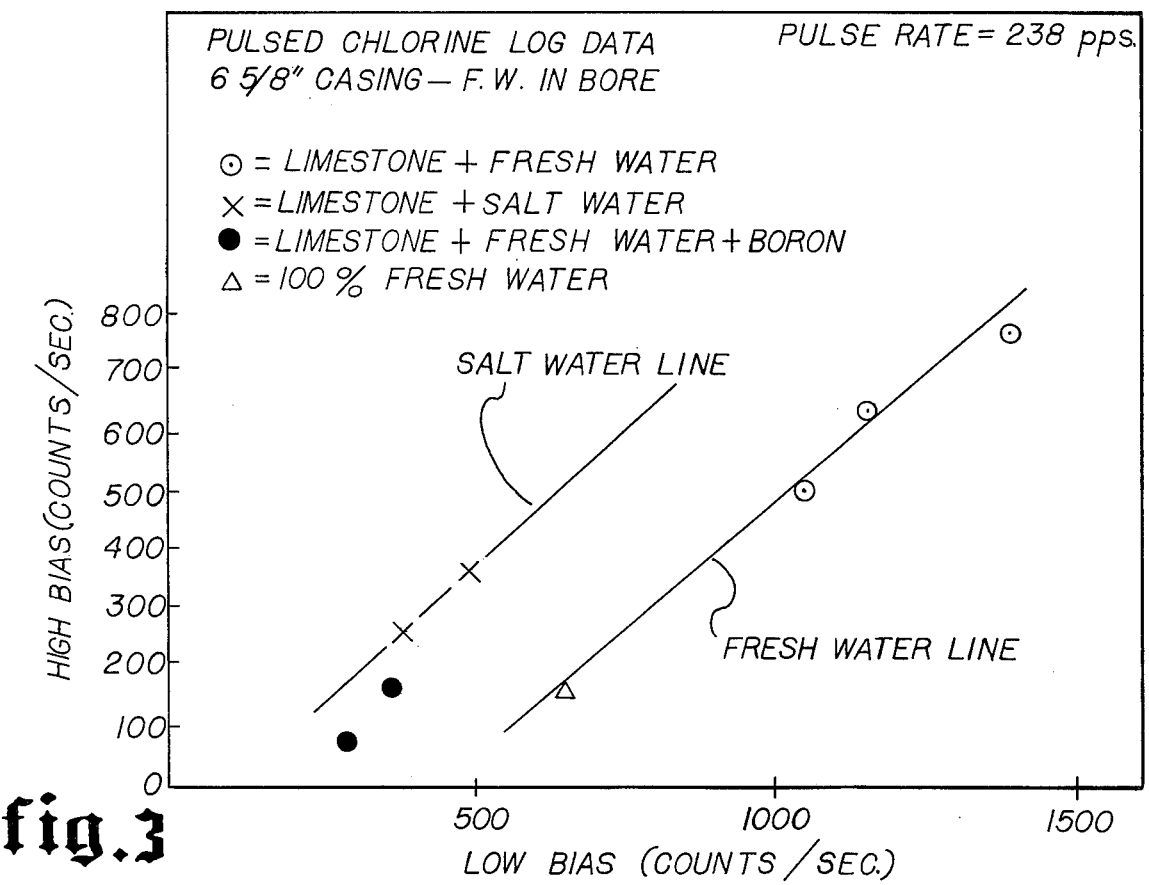
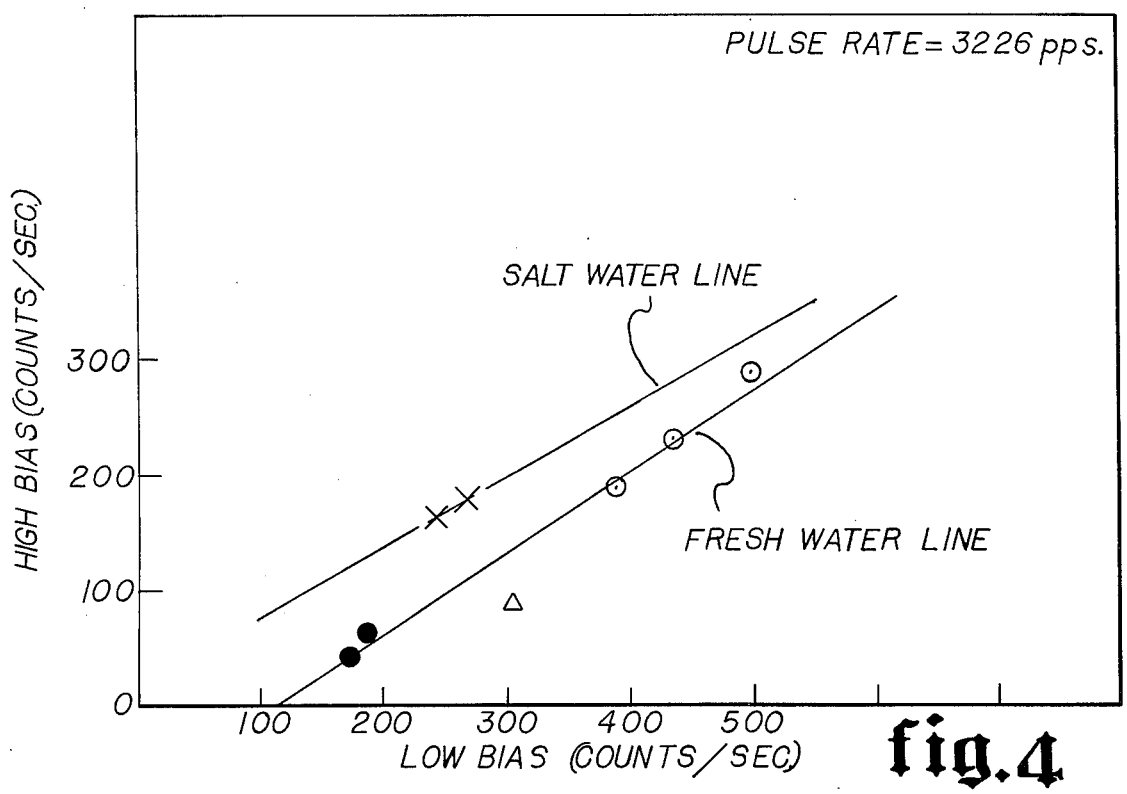

RADIOACTIVE WELL LOGGING SYSTEM WITH SHALE (BORON) COMPENSATION BY GAMMA RAY BUILD-UP

BACKGROUND OF INVENTION

1. Field of Invention

The present invention relates to radioactivity well logging.

2. Description of Prior Art

In the type of radioactivity well logging, known as chlorine logging, such as described in U.S. Pat. No. 3,772,513 which is assigned to the assignee of the present invention to distinguish oil zones from water zones in earth formations, a continuous neutron source is used to emit neutrons into the borehole and earth formations adjacent the borehole. A sleeve of samarium or other suitable material encloses the detector portion of the sonde containing the neutron source and generates selected energy gamma rays to compensate for the adverse effects of boron in the shale formations on the logging measurements. This type of logging is sensitive to borehole conditions, such as changes in borehole fluid salinity, borehole size, casing size, or the condition of the cement annulus. Large variation in any of these borehole factors could introduce errors in interpretation of the log.

It would thus be desirable to use a pulsed neutron source in chlorine logging and so to time gate out borehole effects. However, the time delays before the thermal neutron capture gamma rays are sensed, are sufficiently long that the selected energy gamma radiation component detected due to thermal neutron capture in the samarium sleeve is also substantially eliminated, thereby eliminating the shale or boron compensation provided by the samarium sleeve as described in the aforementioned patent.

SUMMARY OF INVENTION

The present invention relates to radioactivity well logging to evaluate the relative presence of salt water and hydrocarbons from measurements taken in subsurface formations in the vicinity of a well borehole, with compensation for the effects of boron, generally present in shale formations, on the measurements.

Discrete bursts of high energy neutrons are emitted at repetitive intervals from a neutron source in a logging instrument to bombard the earth formations. The fast neutrons are rapidly slowed down and produce a thermal neutron population in the borehole and formations. The thermal neutrons are captured by the nuclei of elements in the formation and borehole and cause the nuclei to emit thermal neutron capture gamma rays which are detected with a gamma ray detector in the logging instrument.

Gamma radiation resulting from capture of the thermal neutron populations in a first energy range, such as from 1.30 to 2.92 Mev, including a significant part of the capture gamma ray spectrum of hydrogen, is detected in the detector at the logging instrument. Gamma radiation resulting from capture of the thermal neutron populations in a second energy range, such as from 3.43 to 10 Mev, distinct from the first energy range and including a significant part of the thermal neutron capture gamma ray spectrum of chlorine is also detected in the detector. The gamma radiation detected in the first and second energy ranges is then transmitted to the surface on conductors of the logging cable, processed and recorded by surface electronic equipment to derive a measure of the relative presence of salt water and hydrocarbons in the formations.

An important feature of the present invention is that the repeated bursts of neutrons are emitted at a particularly chosen rate known as the boron compensation rate. This neutron burst rate is chosen so that the presence of boron in shale in the formations does not cause the derived measure of relative presence of salt water and hydrocarbons to erroneously indicate increased salinity of formation water. In this manner compensation is made for the effects of boron on the measurements, without requiring a special sleeve on the logging instrument.

The boron compensation neutron pulse rate is a pulse rate selected so that in formations of relatively high thermal neutron capture cross-section (such as shaly formations) substantially all thermal neutron capture gamma radiation is generated during the time intervals between neutron bursts. However, in formations of relatively low thermal neutron capture cross-section, a substantial number of thermal neutrons remain uncaptured at the beginning of the next burst. This causes a thermal neutron capture gamma ray build-up between successive neutron bursts. The technique may thus be described as shale compensation by gamma ray build-up.

BRIEF DESCRIPTION OF THE DRAWINGS

FIG. 3 is an example graphical plot illustrating the response of apparatus pulsed at conventional pulsed neutron pulsing rates as for time gating out borehole effects;

FIG. 4 is an example graphical plot illustrating the response of the system of the present invention pulsed at a selected boron compensation rate in accordance with the shale compensation concepts of the present invention;

DESCRIPTION OF PREFERRED EMBODIMENT

It is known that, due to its large macroscopic thermal neutron capture cross-section, the element boron in shaly formations in subsurface earth formations surrounding well boreholes causes problems in the interpretation of thermal neutron capture gamma raddiation well logging techniques. In U.S. Pat. No. 3,772,513 there is disclosed a well logging system using a continuously energized thermal neutron capture gamma radiation detector in a sonde in the well borehole. The sonde is provided with a compensating sleeve of samarium or other suitable material enclosing the detector. This technique produces satisfactory compensation for the interpretation problems caused by boron.

Figure 2:
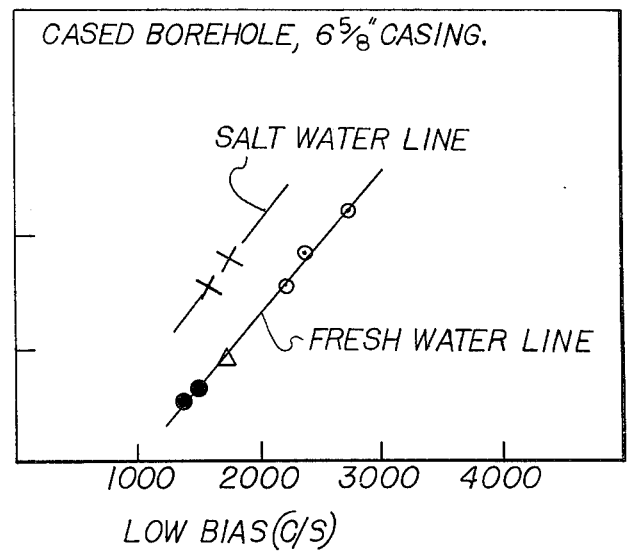
FIG. 2 is an example graphical plot illustrating a procedure for interpretation of logging information using prior art continuous chlorine logging techniques.

A graphical plot of high bias (or Formation chlorine signal) count rates per second versus low bias (or Formation Reference signal) count rates in test limestone formations from such continuous chlorine log is shown in the plot of FIG. 2. Count rates are made using the apparatus and techniques described in the above-referenced patent for salt water and fresh water limestone formations, as designated by accompanying symbols in the legend of FIG. 2, for representative porosities of limestone formations typically encountered. It should be noted that since fresh water and liquid hydrocarbons have similar neutron capture properties, count rates measured in formations saturated with liquid hydrocarbon plot along the line designated as the "fresh water line" of FIG. 2.

From an inspection of FIG. 2, it can be seen that where boron, typically in the form of shale, was present in the limestone formation, this prior art technique provided satisfactory shale compensation. Attention is directed to the plotted points for the shaly fresh water limestone formations. These data conform closely to the water salinity line for other fresh water limestone formations, rather than being indicated as similar salt water limestone formations. This is a good indication of the success of the samarium sleeve compensation technique.

However, this type of continuous logging is sensitive to borehole conditions, such as variations or changes in borehole fluid salinity, borehole size, casing size or changes in the condition of the cement annulus. This is due to the fact that absolute count rate data must be used in the interpretation.

In pulsed neutron lifetime logging, such as in the technique shown in U.S. Pat. No. 3,733,486, the effects of such borehole conditions have generally been minimized by gating out borehole effects due to their time dependence. Accordingly, it has been proposed to use a pulsed neutron source in chlorine logging to obtain the boron compensation effects of the samarium sleeve, while reducing the sensitivity of measurements to fluctuations or changes in the borehole conditions.

However it has been found that unless the rate of emission of the pulsed burstss of neutrons from a neutron source is closely regulated and calibrated, the compensating effect provided by the samarium sleeve gives rise to erroneous results, particularly in formations of high boron equivalence. As will be set forth in detail below, in the present invention the repetition rate of the pulsed neutron source is controlled to a boron compensation rate, derived in a manner to be set forth, to compensate for the effects of shaly formations on pulsed chlorine logging.

This boron compensation rate may be also termed a gamma ray build-up rate, since in formations having low macroscopic thermal neutron capture cross-section, typically low porosity, non shaly formations saturated with hydrocarbons or fresh water, thermal neutron capture gamma radiation accumulates or builds up during the time intervals between neutron bursts from the pulsed neutron source. Conversely, in shaly formations having high macroscopic thermal neutron capture cross-sections, the pulse rate is such that substantially all thermal neutron capture gamma radiation in the formation takes place during the interval between neutron bursts. By thus emitting the repeated bursts of neutrons at the boron compensation rate, boron in the formations does not cause the derived measure of relative presence of salt water and hydrocarbons to erroneously indicate increased salinity of water in the formation, so that compensation is made for the effects of boron in the measurements. Further it has been found that the pulsing of the neutron log at the boron compensation rate accomplishes satisfactory boron compensation so that a samarium sleeve to enclose the detector in the sonde is no longer required for the shale compensation.

Figure 1:
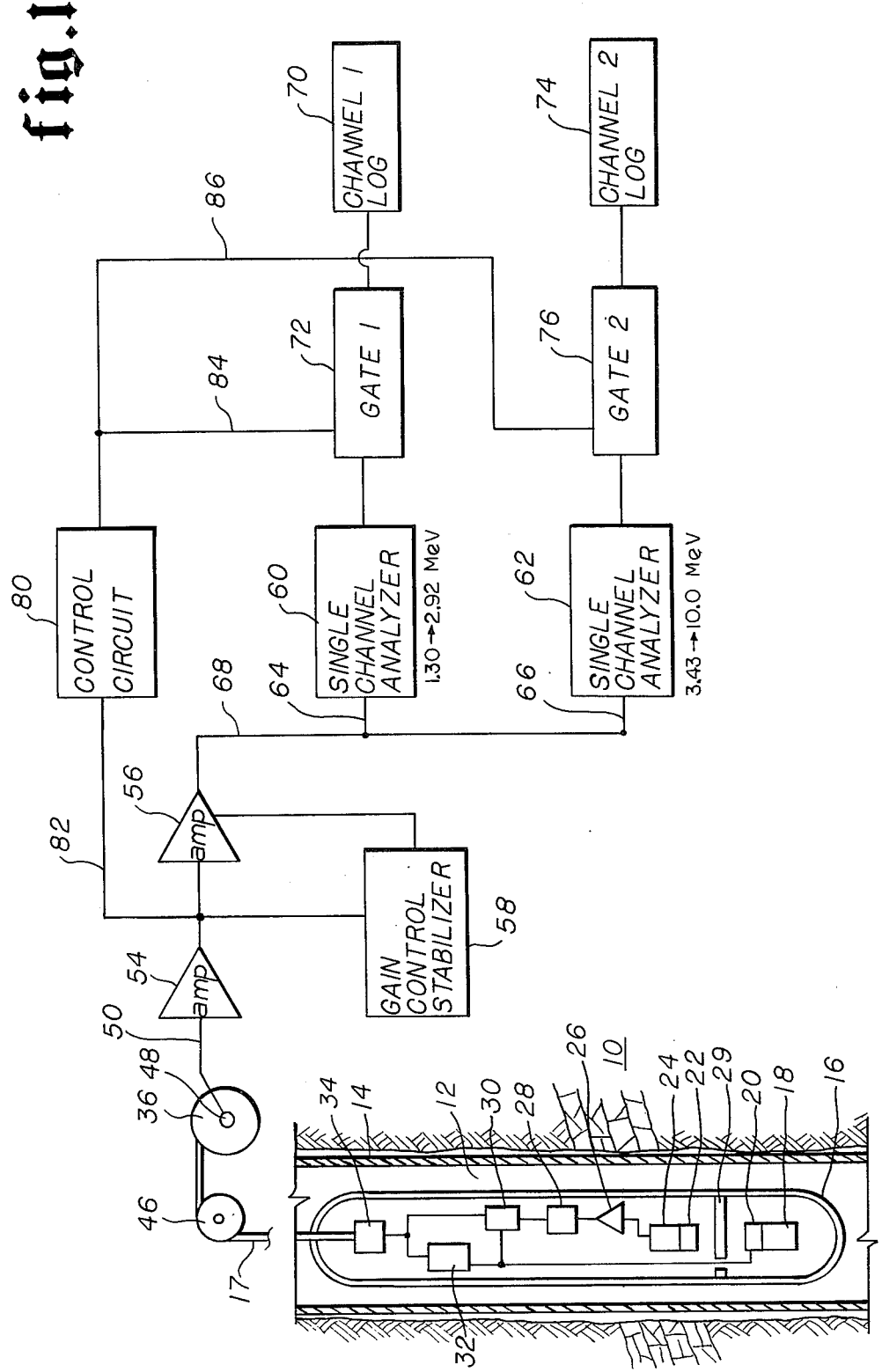
FIG. 1 is a schematic diagram of the system of the present invention.

Referring now to FIG. 1, the system of the present invention for radioactivity well logging to evaluate the relative presence of salt water and hydrocarbons from measurements in subsurface earth formations 10 traversed by a well borehole 12, while permitting compensation to be made for the effects of boron and the like in shaly formations on the measurements. The borehole 12 is illustrated containing a conventional well casing 14. The system includes a fluid tight hollow well tool or sonde 16 suspended in the casing 14 at the lower end of a well logging cable 17.

The sonde 16 contains a source 18 of high energy neutrons in its lower end. Preferably, source 18 comprises an accelerator employing the well known deuterium-tritium reaction to produce a flux of essentially monoenergetic neutrons of an energy level of 14 Mev. A control circuit 20 is electrically coupled to the accelerator 18 for energizing the accelerator 18 to repetitively emit the fast neutrons in discrete bursts or pulses, as will be set forth below. The emitted bursts of high energy neutrons bombard the earth formation 10 and the mean speed of the neutrons is rapidly reduced to a thermal neutron speed of $2.2 \times 10^5$ cm/sec. The thermal neutrons are then absorbed by the nuclei of constituent elements comprising the formation 10 and fluid in the borehole 12 in accordance with the relative thermal neutron capture cross-sections of the nuclei. This causes the nuclei to emit characteristic thermal neutron capture gamma rays which are generally of different energies for different elements.

The sonde 16 is provided with at least one energy proportional radiation detector. Such a detector may comprise, for example, a scintillation detector in the form of an optically transparent thallium-activated crystal 22 of sodium or cesium iodide or the like with an end-window photomultiplier tube 24 optically coupled to the crystal 22. A suitable amplifier 26 receives the output electrical pulses generated in the photomultiplier tube 24 and linearly amplifies such pulses. The amplified pulses are provided to a discriminator 28 which has a trigger level set at a preselected lower energy.

The crystal 22 is preferably spaced sufficiently close, for example approximately 20 ⅞ inches to the accelerator 18, to sense a representative number of capture gamma rays entering the borehole 12 as a result of the neutron bombardment. A suitable neutron shield 29 is preferably interposed between the crystal 22 and the accelerator 18 to limit neutron bombardment of the crystal 22 by the source 18 and to thereby minimize the neutron activation of the substances comprising the crystal 22.

A summing amplifier 30 is adapted to amplify the output of the discriminator 28 and sum therein data pulses from discriminator 28 with combination calibration and synchronization or sync pulses generated by a pulser 32. The sync pulses from the pulser 32 are also supplied to the neutron generator 18 and control circuit 20 to cause activation of the accelerator 18 at the boron compensation rate for a predetermined time duration T. The boron compensation rate and time duration T of the activation of the accelerator 18 are determined in a manner set forth below. The actual pulse repetition rate and duration are controlled by the component values of circuit elements in the control circuit 20. A cable driving network 34 permits electrical energy to pass to the pulsing network 32 from the well logging cable 17, while further permitting the output of the summing amplifier 30 to be transmitted up the well logging cable 17 to surface instrumentation.

In the surface instrumentation, a conventional cable reel or hoist 36 receives unused portions of the logging cable 17 while permitting the cable 17 to be passed over a conventional sheave or measuring wheel 46 into the borehole 12 as the sonde 16 is lowered and raised therethrough. Suitable conventional commutating slip rings 48 are provided with the hoist 46 to permit high voltage power to be provided from conventional power supplies in order to provide operating power to the accelerator 18, photomultiplier tube 24 and other electronic components of the sonde 16. Suitable pick-off circuits (not shown) separate signals from the downhole tool. Since these power supplies and pick-off circuits, as well as their connections with the elements in the sonde 16 through the cable 17 are conventional, they are not set forth in detail in the drawings to preserve clarity therein.

A conductor 50 electrically connects the logging cable 17 through the slip rings 48 to a buffer amplifier 54 so that pulses from the cable driving network 34 in the sonde 16 are provided to the surface instrumentation. A gain control amplifier 56 having its gain controlled by a gain control stabilizer circuit 58 (such as an NC-20 spectrum stabilizer made by Harshaw Chemical Company) provides the signals from the sonde 16 for analysis and processing in a manner to be set forth.

A first single channel analyzer 60 and a second single channel analyzer 62, which are biased to separate electrical pulses in predetermined energy ranges, are electrically connected by conductors 64 and 66, respectively, to an output conductor 68 from amplifier 56. The analyzer 60 is biased to separate only electrical pulses corresponding to a first energy range of from 1.30 to 2.92 Mev. These data pulses from the sonde 16 are separated by the analyzer 60 and are primarily sensitive to hydrogen and relatively insensitive to the effect of chlorine in the borehole 12 and formation 10.

The analyzer 62 is biased to separate only electrical pulses corresponding to a second energy range of from 3.43 to 10.0 Mev, a range distinct from the first energy range of analyzer 60. The analyzer 62 thus separates data pulses in an energy range indicative of the chlorine content of the formation 10, since chlorine emits many thermal neutron capture gamma rays in the range of from about 4 to 8 Mev. Accordingly, by biasing the analyzer 60 and 62 to the separate and distinct energy bands, two signals which are energy dependent are formed. These signals are supplied as inputs to time gates 72 and 76 which are conditioned to pass these pulses at preselected times relative to the neutron burst by the control circuit 80.

The signals from the analyzer 60 indicating data pulses in the first energy range are passed to a Channel 1 log 70 through control time gate 72, desigted "Gate 1." Similarly, the data pulses from the analyzer 62 in the second energy range are passed to a channel 2 log 74 through the second control gate 76, designated "Gate 2." The log circuits 70 and 74 are of the type which count and sum the pulses in the two energy ranges and record these count data as a function of borehole depth. The control gates 72 and 76 are conventional electronic gates, such as AND gates, which permit output pulses from the analyzers 60 and 62, respectively, to pass to the log circuits 70 and 74 in response to timed conditioning signals from the control circuit 80.

The control circuit 80 responds to the sychronization pulses present on the logging cable conductor 50 from the pulser circuit 32 in the sonde 16. These pulses are provided to it from the amplifier 54 over a conductor 82. The control circuit 80 contains therein a time delay circuit, with a 200 microsecond built-in delay. After the receipt of a sync pulse and such time delay, the control circuit 80 forms a control pulse of 100 microseconds duration. The control pulse so formed by circuit 80 is provided to control the time gates 72 and 76 over conductors 84 and 86, respectively. In this manner data pulses may pass through the time gates 72 and 76 to their respective log circuits 70 and 74.

In practicing the present invention, it has been found that the pulse repetition rate of neutron burst emissions from the accelerator 18 bears a highly important and critical role in the accuracy of the logging results in shaly formations or other formations of high boron equivalence. Further, with the present invention, it has been found that if the pulse repetition rate of neutron burst emissions from the accelerator 18 is maintained at the boron compensation rate as defined above, the system of the present invention does not require the presence of a commpensating samarium sleeve about the sonde 16 as was the case with the continuous source chlorine log.

Attention is directed to FIG. 3 representing a graphic plot of test results of the system of the present invention in a test limestone formation. The data shown in FIG. 3 were taken with the neutron source 18 emitting bursts of neutrons, as indicated by a timing wave form 100 (FIG. 5), for a time duration T of 10 microseconds at a neutron burst repetition rate of 238 pulses per second (pps). This provides a period $t_3$ of 4191 microseconds between each of the neutron bursts. As is evident from FIG. 3, the high bias count rate versus low bias count rate plot in fresh water limestone formations having boron therein contains an erroneous indication of increased salinity in the formation. The plotted points for these shaly formations are moved away from the freshwater line, when the neutron source is pulsed at a rate of 238 pulses per second.

In practicing the present invention, it has been found that this erroneous result in formations of high boron equivalence is due to the dominance of the thermal neutron capture events by boron and the absence of any compensation by gamma ray build-up at a period $t_3$ of 4191 microseconds. This causes the high bias count rate versus low bias count rate characteristics of shaly formations to be distorted. In this manner, boron due to its relatively very large thermal neutron capture cross-section in shaly formations, dominates the neutron capture events taking place and unduly distorts the distinction otherwise afforded by chlorine logging between high bias count rate and low bias count rate in salt water and fresh water formations. This phenomenon occurs when the time interval $t_3$ between neutron bursts is sufficiently long enough to permit substantially all thermal neutron capture events to take place before the next neutron burst. A hypothetical example, as symbolized by example wave forms 100a and 100b (FIG. 5), measured gamma ray count rates $C_A$ and $C_B$, indicated by shaded areas under the wave forms in formations having different thermal neutron decay times $\tau_A$ and $\tau_B$ are equal. In both hypothetical wave forms 100a and 100b (FIG. 5), $t_3$=4191 microseconds is sufficiently long to permit all capture neutron events to take place before the next neutron burst. A period of $t_3=4191$ microseconds therefore permits no gamma ray build-up and would therefore result in erroneous count rate measurements in shaly (boron) formations.

Accordingly, with the present invention, it has been found that by substantially increasing the neutron pulse repetition rate and by substantially reducing the neutron pulse duration T, the erroneous result induced by the presence of boron is removed. Further, it has been found that, unexpectedly, the compensating samarium sleeve enclosing the sonde is no longer required.

Figure 5:
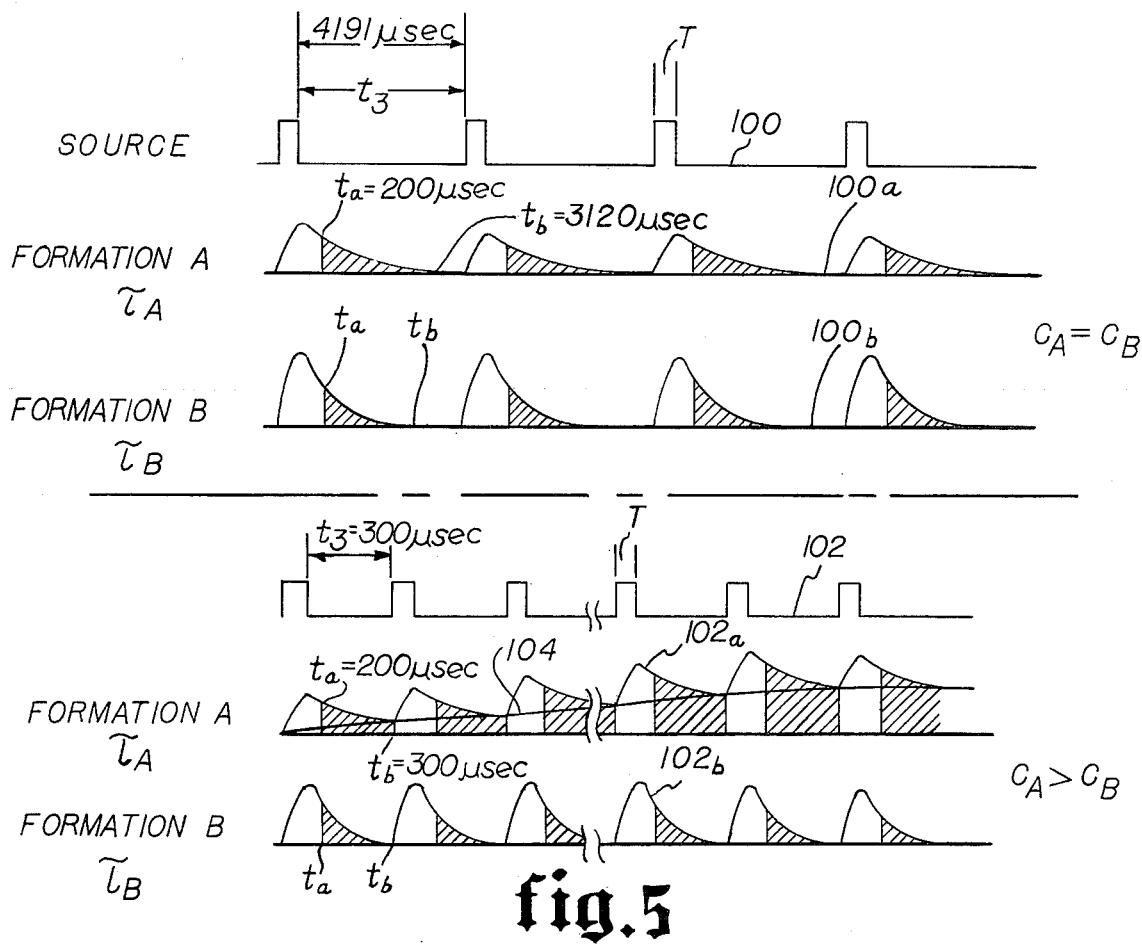
FIG. 5 is a group of signal waveform diagrams of signals present at various pulse rates in the system of the present invention.

In FIG. 4, a plot is presented of test results of the system of the present invention in the same test limestone formations in which the data of FIG. 2 and FIG. 3 were obtained. In the case of FIG. 4, the source 18 is controlled to emit bursts of neutrons of a time duration T of 10 microseconds at a pulse repetition rate of 3226 pulses per second (pps). The between pulse time interval $t_3$ is 300 microseconds, as indicated by a waveform 102 (FIG. 5). The repetition rate of 3226 pulses per second was determined in a manner to be set forth below. As symbolized by example waveforms 102a and 102b (FIG. 5) gamma ray count rates $C_A$ and $C_B$ in formations of different thermal neutron decay time $\tau_A$ and $\tau_B$ differ due to the shortened time $t_3$. Inspection of the plot in FIG. 4, although the number of counts per second is substantially less than that of FIG. 3 or FIG. 2, indicates that the fresh water shaly limestone formation test points are again substantially aligned with the fresh water line, correctly indicating the formation as being a fresh water (or hydrocarbon) formation.

Thus, by substantially reducing the time interval between neutron bursts (shortening the time interval $t_3$ as indicated in the timing waveform 102) the presence of boron or shale in formations may be compensated for. This has been determined to occur due to the emphasis imposed by the shortened time interval on measured counting rates in formations with large thermal neutron decay time $\tau$, and consequent small thermal neutron capture cross-section.

Another effect of shortening the time interval $t_3$ between neutron bursts is that, in formations having relatively large thermal neutron decay time $\tau$, the time interval $t_3$ between neutron bursts is so short that a gamma ray "build-up" phenomena takes place, as indicated by an envelope 104 representing the increasing number of counts between successive neutron bursts. This increasing number of counts occurs due to the residual carry-over of uncaptured thermal neutrons in the formation between successive burst intervals. The residual carry-over of uncaptured thermal neutrons rapidly reaches a saturation level for a given formation decay time $\tau$ within several neutron bursts.

Physically, the contribution of this "build-up" radiation in the high bias count rate versus low bias count rate plots is a function of the thermal neutron decay time $\tau$ of the formation and the intensity of radiation from the accelerator 18. For a formation of a given thermal neutron decay time, the percent of radiation in both the high bias energy range and low bias energy range due to the gamma ray build-up is the same. It should be noted, however that the ratio of low bias to high bias radiation is of course not the same for all formations. As has been set forth above, salt water filled formations of a given lithology and porosity will have a smaller low bias to high bias ratio than the corresponding fresh water formation. Therefore, the build-up effect will change the position of point plots of high bias count rate versus low bias count rate along lines of different slope depending upon the low bias to high bias ratio for the formation. Further, the distance a given point moves on such a plot will be determined by the percent of total radiation contributing to the count rate which is build-up radiation. This, in turn, is related to the thermal neutron decay time $\tau$ in the formation.

DETERMINATION OF BORON COMPENSATION RATE

For any formation, $C(t_a,t_b)$, the number of gamma ray counts recorded between times $t_a$ and $t_b$ following a burst of neutrons in a series of neutron bursts is defined as:

$$C(t_a,t_b) = Z \frac{F(T,t_3)(1-e^{-T/\tau})(e^{-t_a/\tau}-e^{-t_b/\tau})}{(1-e^{-(t_3+T)/\tau})} \quad (1)$$

where $C(t_a,t_b)$ = Counts/neutron burst recorded between times $t_a$ and $t_b$ measured from the termination of the neutron burst;

$T$ = burst width in microseconds;

$t_3$ = time from end of neutron burst to beginning of next neutron burst (FIG. 5);

$\tau$ = thermal neutron lifetime in formation;

$Z$ = a term which is a function of the capture cross section of the elements in the formation, the gamma ray detection efficiency, the source-detector spacing, and the physical geometry of the sonde; and $F(T,t_3)$ = is the neutron output while the source is gated "on" (neutrons/second).

For the sonde 16 of the configuration set forth above:

$$F(T,t_3) = 10^8 \frac{(t_3+T)}{T} \text{ neutrons/sec.} \quad (2)$$

For $t_a$ = 200 microseconds and $T$ = 10 microseconds and using the above ratio for $F(10,t_3)$, equation (1) can thus be written as:

$$C(200,t_b) = 10^8 \cdot \frac{t_3+10}{10} [Z(1-e^{-10/\tau})e^{-200/\tau}]$$

$$\cdot \frac{(1-e^{-(t_b-200)/\tau})}{(1-e^{-(t_3-10)/\tau})} \quad (3)$$

Equation (3) is the number of counts recorded between the times 200 microseconds and $t_b$ microseconds per burst of neutrons. $C'(200,t_b)$, the corresponding count rate recorded at the surface in counts per second, is related to $C(200,t_b)$ by:

$$C'(200,t_b) = C(200,t_b) \frac{(10^6)}{(t_3+10)} \quad (4)$$

where $$\frac{(10^6)}{(t_3+10)}$$

is the pulse repetition rate in pulses per second. Inserting equation (3) into equation (4) yields:

$$C'(200,t_b) = \frac{10^8(t_3+10)}{10}[Z(1-e^{-10/\tau})e^{-200/\tau}]$$

-continued $$\times \frac{(1-e^{-200/\tau})}{(1-e^{-10/\tau})} \frac{(10^6)}{(t_3+10)} \quad (5)$$

or after simplification:

$$= \frac{10^{13} [Z(1-e^{-10/\tau})e^{-200/\tau}] (1-e^{-200/\tau})}{(1-e^{-(t-10)/\tau})(t_3+10)} \quad (5a)$$

FIG. 3 can thus be regarded as a plot of the function:

$$C'(200,3120) = 10^{13} \frac{[Z(1-e^{-10/\tau})e^{-200/\tau}](1-e^{-(3120-200)/\tau})}{(1-e^{-(4191+10)/\tau})}$$

FIG. 3 contains experimental data measured in various test pit formations with T=10 microseconds, $t_a$=200 microseconds, $t_b$=3120 microseconds, and $t_3$=4191 microseconds.

For each test pit formation, the quantity K is defined as:

$$[Z(1-e^{-10/\tau})e^{-200/\tau}] = K$$

was computed for the high bias and low bias. The results are listed in Table I.

TABLE I

| Formation | $\tau$ Microseconds | K×10$^{13}$ (Counts/Sec) HB | LB |
|---|---|---|---|
| Lime+salt water(S.W.) | 108 | 275 | 418 |
| Lime+S.W. | 153 | 344 | 525 |
| Lime+Fresh Water (F.W.) +Boron(B) | 124 | 77 | 317 |
| Lime+F.W.+B | 179 | 124 | 391 |
| Lime+F.W. | 411 | 486 | 1060 |
| Lime+F.W. | 541 | 633 | 1255 |
| Lime+F.W. | 529 | 800 | 1465 |
| F.W. | 200 | 211 | 693 |

Once the values for K have been determined in each of the test formations for the high bias and the low bias, these values were used in equation (3) to compute corresponding values $C'(200,t_b)$ for various values of $t_b$ and $t_3$ holding T=10 microseconds and $t_a$=200 microseconds. FIG. 3 shows such a set of calculations for T=10 microseconds, $t_a$=200 microseconds, $t_b$=1500 microseconds, and $t_3$=4190 microseconds.

FIG. 4 shows a similar set of calculations for T=10 microseconds, $t_a$=200 microseconds, $t_b$=300 microseconds, and $t_3$=300 microseconds.

Computations in the manner set forth above are performed until a value for $t_3$ is found defining a pulse rate, which provides satisfactory boron compensation, which can then be verified in the test formations.

In data plotted in FIG. 3 using the low pulse rate, $(t_3+T)/\tau \gg 1$ and $t_b/\tau \gg 1$. Physically, this means that the period between bursts is so long that for the $\tau$ values encountered in the test formation (which case is representative of $\tau$ values found in actual field conditions), all capture radiation from the previous burst of neutrons had decayed to a negligible level before the next burst of neutrons occured. As a result, there was no gamma radiation build-up from the previous burst. This, in turn, resulted in minimal boron compensation (i.e. Lime+fresh water+Boron points fall on or near salt water line).

In FIG. 2, $(t_3 + T/\tau$ and $t_b/\tau$ varied from $\simeq 0.5$ to $\simeq 3.0$. This indicates that appreciable build-up was encountered, especially in the large $\tau$ formations. As a result, good boron compensation was obtained.

The calibration of the pulsed chlorine logging tool 16 and the relating of the recorded low bias and high bias counting rates to percent water saturation is then performed using the techniques set forth in U.S. Pat. No. 3,772,513.

The saltwater-freshwater line spread in low bias count rate versus high bias count rate plots, the counting rates and the boron compensation can be adjusted by additional minor adjustements in the source repetition rate and the energy bias of the gamma ray detector. Determination of the boron compensation rate for formations of other lithology may be made in the manner set forth above in corresponding test formations in conjunction with Equation (5) or (5a).

It should be understood that the two logging signals of FIG. 1 may be recorded on the same record medium, as an alternative to being recorded as individual traces on separate logging records. The two records may be interpreted by overlaying one with respect to the other in order that corresponding variations and differences between the respective logs may be observed.

It is also contemplated that, instead of recording both signals individually, only one of the two signals (preferably the hydrogen content signal (or low bias)) may be recorded together with a second correlated signal showing the ratio or difference between the hydrogen (or low bias) and hydrogen and chlorine (or high bias) signals.

It will also be understood that the logging signals may be recorded magnetically on tapes or discs and may be submitted to computer processing either in analog or digital format. In this instance, appropriate mathematical or computer techniques may be employed to provide a resultant signal representing differences or otherwise showing variations between the signals, or which may be a plot of one against the other.

The foregoing disclosure and description of the invention are illustrative and explanatory thereof, and various changes in the size, shape and materials, as well as in the details of the illustrated construction may be made without departing from the spirit of the invention.

We claim:

1. A method of radioactivity well logging to evaluate the relative presence of salt water and hydrocarbons from measurements in subsurface earth formations in the vicinity of a well borehole, with compensation for the effects of boron in shaly formations on the measurements, comprising the steps of:
   a. emitting in a borehole at repeated intervals discrete bursts of high energy neutrons from a logging instrument having a neutron source and a radiation detector to bombard the earth formations and produce a succession of thermal neutron populations in the borehole and formations;
   b. detecting radiation at the logging instrument resulting from capture of the thermal neutron populations and emission of thermal neutron capture gamma radiation in a first energy range including a significant part of the neutron capture gamma spectrum of hydrogen;

c. detecting radiation at the logging instrument resulting from capture of the thermal neutron populations and emission of thermal neutron capture gamma radiation in a second energy range including a significant part of the neutron capture gamma spectrum of chlorine which is distinct from that of hydrogen;

d. deriving from the radiation detected in the first and second energy ranges a measure of the relative presence of salt water and hydrocarbons in the formations; and e. controlling said step of emitting so that each of the repeated bursts of neutrons is emitted at a boron compensation rate so that the presence of boron in the formations does not cause the derived measure of relative presence of salt water and hydrocarbons to erroneously indicate increased salinity, wherein compensation is made for the effects of boron on the measurements.

2. The method of claim 1, wherein a time interval occurs between the repeated emission of bursts of neutrons during said step of emitting and said step of controlling comprises the step of:

controlling said step of emitting so that the boron compensation rate is a pulse rate wherein, in shaly formations, substantially all thermal neutron capture gamma radiation takes place during said time interval between emission of bursts of neutrons.

3. The method of claim 1, wherein a time interval occurs between the repeated emission of bursts of neutrons during said step of emitting and said step of controlling comprises the step of:

controlling said step of emitting so that the boron compensation rate is a pulse rate wherein, in formations having low thermal neutron capture cross sections, a substantial thermal neutron population remains uncaptured after said time interval between emission of bursts of neutrons.

4. The method of claim 1, wherein a time interval occurs between the repeated emission of bursts of neutrons during said step of emitting and said step of controlling comprises the step of:

controlling said step of emitting so that the boron compensation rate is a pulse rate wherein, in formations having low thermal neutron capture cross sections, a gamma ray build-up occurs during successive time intervals of emission of bursts of neutrons.

5. The method of claim 1, wherein the formations have a thermal neutron lifetime $\tau$ and wherein:

a. said step of emitting comprises emitting bursts of time duration T occurring at repeated time intervals $t_3$ from each other; and b. said step of controlling comprises controlling the time interval $t_3$ so that the ratio of $t_3$ plus T to the formation lifetime $\tau$ is 3 or less.

6. The method of claim 1, wherein the formations have a thermal neutron lifetime $\tau$ and wherein:

a. said step of emitting comprises emmitting bursts of time duration T occurring at repeated time intervals $t_3$ from each other; and b. said step of controlling comprises controlling the time interval $t_3$ so that the ratio of $t_3$ plus T to the formation lifetime $\tau$ is from 0.5 to 3.

7. The method of claim 1, further including the step of:

forming an output record of the measure of relative presence of salt water and hydrocarbons derived during said step of deriving.

8. The method of claim 1, wherein:

a. said step of detecting radiation at the logging instrument in a first energy comprises detecting radiaton in the energy range of from 1.30 to 2.92 Mev; and b. said step of detecting radiation at the logging instrument in a second energy comprises detecting radiation in the energy range of from 3.43 to 10.0 Mev.

9. An apparatus for radioactivity well logging to evaluate the relative presence of salt water and hydrocarbons from measurements in subsurface earth formations in the vicinity of a well borehole, with compensation for the effects of boron in shaly formations on the measurements, comprising:

a. means for emitting at repeated intervals discrete bursts of high energy neutrons from a logging instrument having a neutron source and a radiation detector in the borehole to bombard the earth formations and produce thermal neutron populations in the borehole and formations;

b. first means for detecting radiation at the logging instrument resulting from capture of the thermal neutron populations and emission of thermal neutron capture gamma radiation in a first energy range including a significant part of the neutron capture gamma spectrum of hydrogen;

c. second means for detecting radiation at the logging instrument resulting from capture of the thermal neutron populations and emission of thermal neutron capture gamma radiation in a second energy range including a significant part of the neutron capture gamma spectrum of chlorine which is distinct from that of hydrogen;

d. means for deriving from the radiation detected in said first and second means for detecting a measure of the relative presence of salt water and hydrocarbons in the formations; and e. means for controlling said means for emitting so that each of the repeated bursts of neutrons is emitted at a boron compensation rate so that the presence of boron in the formations does not cause the derived measure of relative presence of salt water and hydrocarbons to erroneously indicate increased salinity, wherein compensation is made for the effects of boron on the measurements.

10. The apparatus of claim 9, further including:

means for forming an output record of the measure of relative presence of salt water and hydrocarbons in said means for deriving.

11. The apparatus of claim 9, wherein:

a. said first means for detecting radiation comprises means for detecting radiation in the energy range of from 1.30 to 2.92 Mev; and b. said second means for detecting radiation comprises means for detecting radiation in the energy range of from 2.92 to 10.0 Mev.

* * * * *